US011982438B2

(12) United States Patent
He et al.

(10) Patent No.: US 11,982,438 B2
(45) Date of Patent: May 14, 2024

(54) UNIFORM ILLUMINATION LENS AND LAMP THEREOF

(71) Applicants: Self Electronics Co., Ltd., Zhejiang (CN); Wanjiong Lin, Zhejiang (CN); Self Electronics USA Corporation, Norcross, GA (US)

(72) Inventors: Zuping He, Zhejiang (CN); Yuanfang Xue, Zhejiang (CN); Zhaoyong Zheng, Zhejiang (CN); Huangfeng Pan, Zhejiang (CN)

(73) Assignee: Sell Electronics Co., Ltd., Ningbo (CN)

( * ) Notice: Subject to any disclaimer, the term of this patent is extended or adjusted under 35 U.S.C. 154(b) by 0 days.

(21) Appl. No.: 18/458,552

(22) Filed: Aug. 30, 2023

(65) Prior Publication Data

US 2024/0068641 A1 Feb. 29, 2024

(30) Foreign Application Priority Data

Aug. 30, 2022 (CN) ......................... 202211047578.3

(51) Int. Cl.

| | |
|---|---|
| ***F21V 5/04*** | (2006.01) |
| ***F21V 7/00*** | (2006.01) |
| ***F21V 7/04*** | (2006.01) |
| ***F21Y 103/10*** | (2016.01) |
| ***F21Y 115/10*** | (2016.01) |

(52) U.S. Cl.

CPC ................ *F21V 5/04* (2013.01); *F21V 7/005* (2013.01); *F21V 7/045* (2013.01); *F21Y 2103/10* (2016.08); *F21Y 2115/10* (2016.08)

(58) Field of Classification Search

CPC . F21V 5/04; F21V 7/005; F21V 7/045; F21Y 2103/10; F21Y 2115/10

See application file for complete search history.

(56) References Cited

PUBLICATIONS

He et al., CN 115419863, Dec. 2022 (Year: 2022).*
Chen et al., CN 104154494, Nov. 2014 (Year: 2014).*
He et al., CN 106931403, Jul. 2017 (Year: 2017).*
Li, CN 113898891, Jan. 2022 (Year: 2022).*
Tamaoki et al., CN 1376314, Oct. 2002 (Year: 2002).*

* cited by examiner

*Primary Examiner* — Mary Ellen Bowman
(74) *Attorney, Agent, or Firm* — Wang Law Firm, Inc.

(57) ABSTRACT

A uniform illumination lens is arranged between a light source and an illumination surface and has a light receiving surface and a light distribution surface, the light receiving surface has a first incident surface and a second incident surface; the light distribution surface has a first emergent surface and a second emergent surface which are connected with each other; all light entering from the first incident plane in the lens is totally reflected by the reflecting plane, reflected light is emitted through the first emergent plane and does not intersect with the first incident plane, and the second emergent plane receives all light entering from the second incident plane on one side of the normal. The lens provided by the invention provides uniform illumination at near and far positions of an irradiation surface.

14 Claims, 9 Drawing Sheets

UNIFORM ILLUMINATION LENS AND LAMP THEREOF

RELATED APPLICATION

This application claims priority to a Chinese Patent Application No. CN202211047578.3, filed on Aug. 30, 2022.

FIELD OF THE TECHNOLOGY

The invention relates to the field of lamps, in particular to a lens capable of realizing uniform illumination and a lamp thereof.

BACKGROUND

At present, when illuminating objects with high heights such as shelves or walls, a light source is generally placed in front of it. In the case of exhibitions, for example, the near and far sides of the light source need to achieve uniform lighting effects. Common light sources on the market have a single structure and divergent light, which cannot achieve uniform lighting effects at far and near. It is often necessary to set up multiple light sources to illuminate different directions separately, which is costly and relatively complicated to arrange.

Therefore, those skilled in the art are devoting themselves to developing a lens and a corresponding lamp to realize uniform illumination near and far away from a designated illuminating surface such as a shelf or a wall.

BRIEF SUMMARY OF THE TECHNOLOGY

In view of the above-mentioned defects in the prior art, the technical problem to be solved by the present invention is how to provide a lens that can achieve uniform illumination on the illumination surface and take into account both near and far lighting requirements.

In order to achieve the above object, the present invention provides a uniform illumination lens, which is arranged between a light source and an illumination surface, which includes a light receiving surface and a light distribution surface, and the light source is installed on a substrate, a normal line of the substrate passes through the light source, the light receiving surface comprises a first incident surface and a second incident surface intersecting, and the first incident surface and the second incident surface constitute the accommodating cavity of the light source, and the first incident surface is arranged on one side of the normal line away from the illuminated surface, and the normal line is passed through the second incident surface; the light distribution surface comprises a connected first outgoing surface and a second outgoing surface, the first outgoing surface and the first incident surface are arranged on the same side of the normal line, and the contact point of the first outgoing surface and the second outgoing surface is closer to the normal line than the first incident surface; it further comprises a reflective surface, one end of which is connected to the first outgoing surface; On one side of the normal line, all the light entering from the first incident surface in the lens is totally reflected by the reflective surface, and the reflected light is emitted through the first outgoing surface, and the reflected light does not intersect with the first incident surface; On the other side of the normal line, the second outgoing surface receives light entering from the second incident surface on one side of the normal line.

The reflective surface has a near-light end close to the light source, the first incident surface has a rendezvous part intersecting with the second incident surface, and the linear extension of the line between the near-light end and the rendezvous part intersects the first outgoing surface.

- in the cross-sectional direction of the lens, for any point on the reflective surface, the included angle between a tangent line passing through this point and the normal direction is defined as the first included Angle $\alpha$, and the included Angle between the connection line between the point and the intersection part and the normal direction is the second included Angle $\beta$, then the first included Angle $\alpha$ satisfies the relation expression: $(90°-\beta)/2\leq\alpha<45°$.
- for adjacent points on the reflective surface, as the second included angle $\beta$ increases, the first included angle $\alpha$ decreases continuously.
- the reflective surface is a smooth continuous convex surface.
- the first incident surface is parallel to the normal direction.
- the first incident surface forms an included angle with the normal direction, and one end of the first incident surface intersecting with the second incident surface is closer to the normal line than the other end.
- a first bottom surface is transitionally connected between the first incident surface and the reflective surface, and the first bottom surface matches the installation surface of the light source.
- the first outgoing surface is a flat surface.
- the second outgoing surface is a convex surface.
- a part of the second incident surface on the side of the normal line opposite to the first incident surface is set as a concave surface.
- a part of the second incident surface on the same side of the normal line as the first incident surface is set as a convex surface.
- the lens is elongated.
- strip-shaped light-transmitting ribs are arranged on the light distribution surface along the length direction of the lens to form a linear light-emitting structure.

A lamp, comprising a lamp holder, a lampshade, and a light source arranged on the lamp holder, It is characterized in that, the uniform illumination lens is further provided on the lamp holder, and the light source is arranged in the accommodating cavity.

- the lens and the lamp holder are strip-shaped, and the light source adopts a plurality of LED chips, which are arranged at intervals on the circuit board along the length direction of the lamp holder.
- the lampshade is provided with strip-shaped light-transmitting ribs arranged along the length direction of the lamp.

The uniform illumination lens and its lamps provided by the present invention can avoid the generation of stray light in the lens through the structural design of the light receiving surface and the light distribution surface, and can realize uniform illumination near and far from the illumination surface, and are suitable for shelves and the usage scenarios on display.

The idea, specific structure and technical effects of the present invention will be further described below in conjunction with the accompanying drawings, so as to fully understand the purpose, features and effects of the present invention.

BRIEF DESCRIPTION OF THE DRAWINGS

The following describes embodiments of the present invention in conjunction with the accompanying drawings, wherein.

DETAILED DESCRIPTION OF THE INVENTION

The following specific embodiments of the present invention will be described in further detail based on the accompanying drawings. It should be understood that the description of the embodiments of the present invention here is not intended to limit the protection scope of the present invention.

Figure 1:
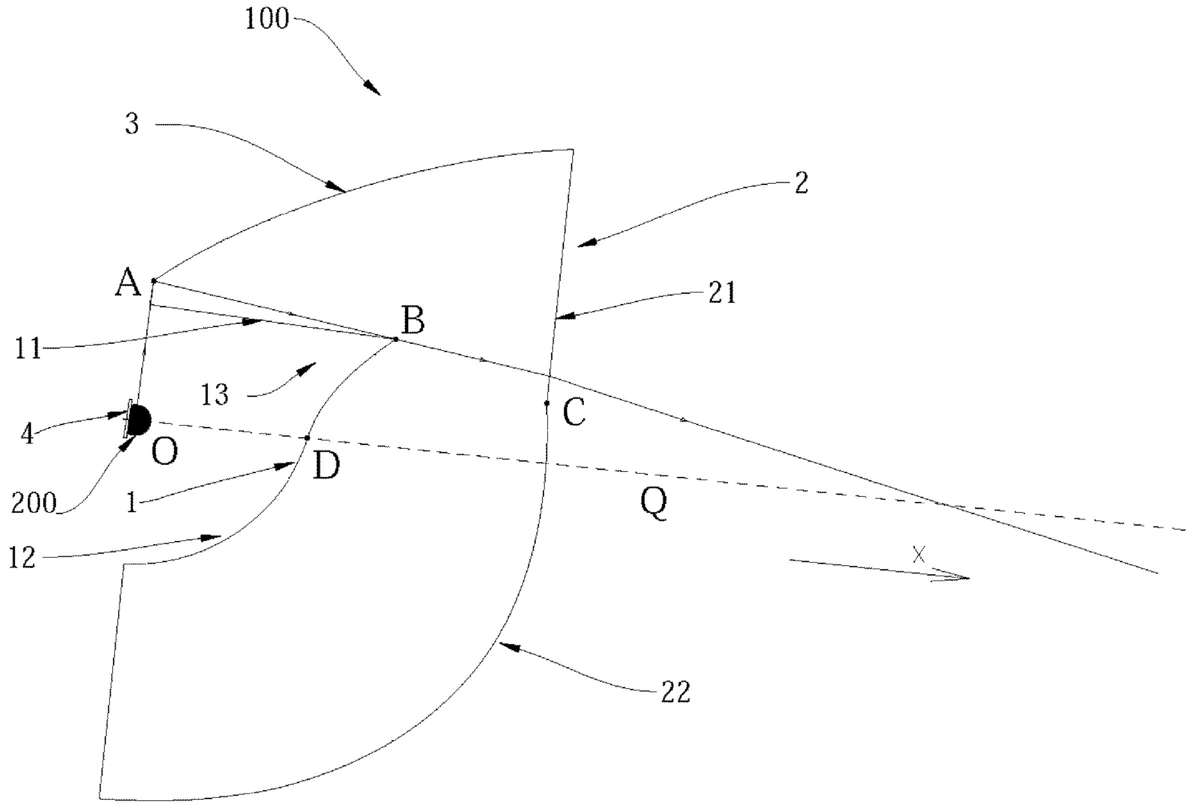
FIG. 1 is a schematic cross-sectional view of the main structure of a uniform illumination lens of the present invention.

As shown in FIG. 1, the uniform illumination lens provided by the present invention is arranged between the light source 200 and the illumination surface 300, the light source 200 is installed on the substrate 4, and a normal line OQ of the substrate 4 passes through the light source 200. The middle part of the lens 100 is passed by the normal line OQ, which includes a light receiving surface 1, which is arranged on the side close to the light source 200 along the normal direction x, and a light distribution surface 2, which is opposite to the light receiving surface 1 along the normal direction x.

The light receiving surface 1 includes a first incident surface 11 and a second incident surface 12, the first incident surface 11 and the second incident surface 12 intersect at the intersection B and form an angle, and the first incident surface 11 and the second incident surface 12 constitutes an accommodating cavity 13, and the light source 200 is disposed in the accommodating cavity 13. Wherein, the first incident surface 11 is set on the side of the normal line OQ away from the illumination surface 300, and is parallel to or forms an angle with the normal line direction x; the normal line OQ passes through the second incident surface 12 and intersects at D, and the second incident surface 12 is a curved surface. The light distribution surface 2 includes a connected first outgoing surface 21 and a second outgoing surface 22, wherein the first outgoing surface 21 and the first incident surface 11 are arranged on the same side of the normal OQ, and The contact point C of the first outgoing surface 21 and the second outgoing surface 22 is closer to the normal line OQ than the first incident surface 11; in addition, a reflective surface 3 is also included, and the reflective surface 3 is arranged on the same side of the normal line OQ as the first incident surface 11 and the first outgoing surface 21, one end thereof is connected to the first outgoing surface 21, and the other end faces the light source 200. In the uniform illumination lens provided by the present invention, on one side of the normal line OQ, all light entering from the first incident surface 11 is totally reflected by the reflective surface 3, and then exits obliquely to the illuminated surface through the first outgoing surface 21, and the reflected light does not intersect with the first incident surface 11, on the other side of the normal line OQ, the second outgoing surface 22 receives all the light entering from the second incident surface 12 and refracts it to the side of the illumination surface 300 near the light source 200.

In the lens structure shown in FIG. 1, if the normal direction x is set as the left and right direction, then the point D divides the second incident surface 12 into upper and lower parts, and with the normal line OQ as the boundary, for the incident light on the lower side of the normal line OQ, the incident light enters the lens 100 from the second incident surface 12, and after being refracted by the second outgoing surface 22, it arrives near the illumination surface 300 below the lens 100; for the incident light on the upper side of the normal line OQ, the incident light is divided into two parts, a part of the incident light is refracted by the first incident surface 11 and then totally reflected by the reflective surface 3. after being totally reflected by the reflective surface 3, it passes obliquely downward through the first outgoing surface 21 and exits to the far side of the illumination surface 300 on the lower right side of the lens 100, and another part of the incident light passes through the part on the upper side of the normal line OQ of the second incident surfaces 12 (that is, the BD part) and is refracted to the first outgoing surface 21 and/or the second outgoing surface 22, and exits to the illumination surface 300 at the bottom right of the lens 100.

All the light rays entering from the first incident surface 11 in the lens of the present invention, after total reflection by the reflective surface 3, all the reflected light rays are reaching the first outgoing surface 21 without passing through the first incident surface 11, and these light rays are able to reach the portion of the illumination surface 300 which is further away from the lens, and it is avoided that the reflected light reaches the first incident surface 11 again resulting in the refracted stray light, so as to make the outgoing light homogenized.

According to the characteristics of the above-mentioned light path, in the lens of the present invention, the end of the reflective surface 3 near the light source 200 is defined as the near-light end A, and the intersection of the first incident surface 11 and the second incident surface 12 is the rendezvous part B; On the one hand, all the light rays after total reflection reach the first light-emitting surface, then, at the extreme position where a reflected light just passes through the intersection part B, the straight line extension of the line connecting the near-light end A and the intersection part B intersects at the first outgoing surface. on the other hand, all the light through the total reflection bypasses the first incident surface 11, therefore, the shape of the reflective surface 3 is further required to at least realize that the light near the near-light end A bypasses the first incident surface 11 and reflects through the first outgoing surface 21.

Figure 2:
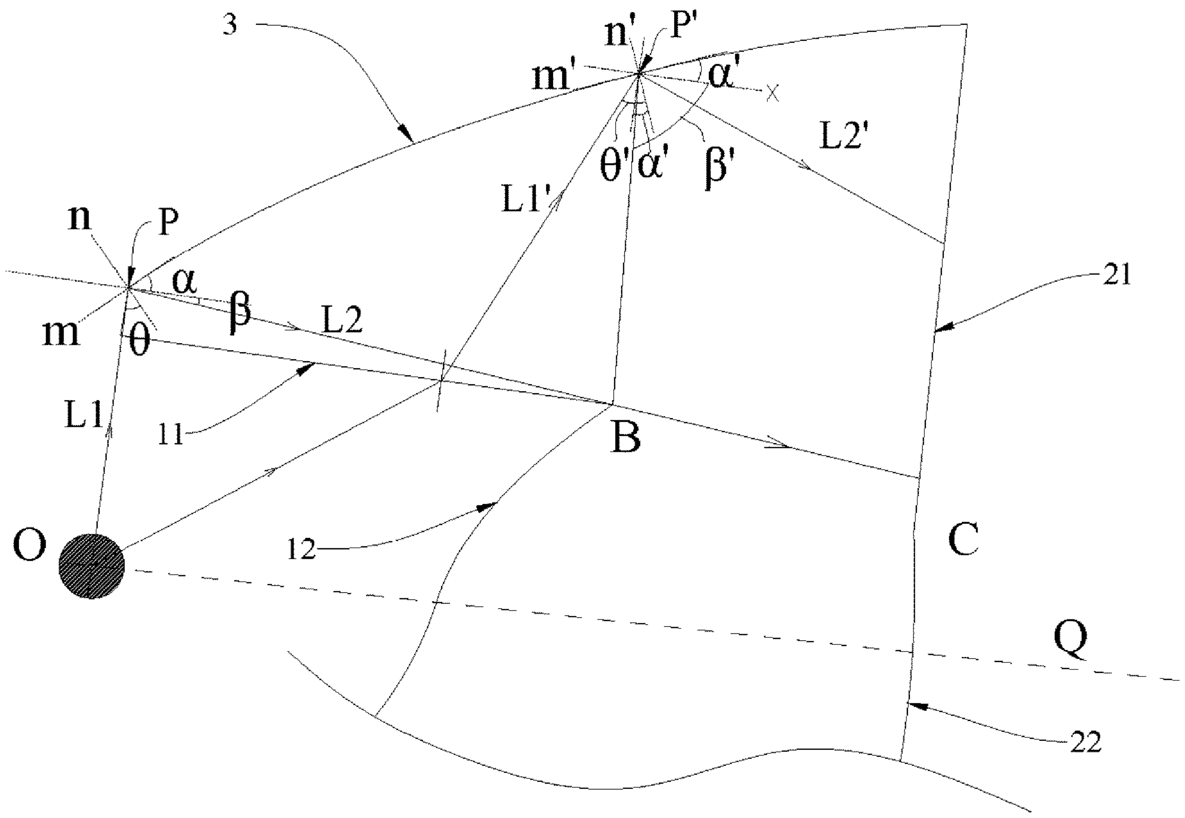
FIG. 2 is a schematic of the optical path of the uniform illumination lens shown in FIG. 1.

A schematic diagram of the light path in the direction of the cross-section of the lens 100 is shown in FIG. 2. For any point on the reflective surface 3, the direction of the tangent m to the reflecting surface with respect to the point, the light refracted from the first incident surface 11 into the lens 100 has an incident angle of θ on the reflective surface 3, the angle between the tangent m to the reflective surface passing through the point and the normal direction x is a first angle α, and the angle between the line connecting the point with the rendezvous portion B and the normal direction x is a second angle β, such that in the case where the direction of the reflected light is to the right in a downward direction, there is the following relation:

$$\theta+\alpha+\beta=45°,$$

Since θ≥α and there is θ=α only when the incident ray of the reflective surface 3 is perpendicular to the normal direction x, and when the incident ray L1 of the reflective surface 3 is perpendicular to the normal direction x, for example, at the position of the point P in FIG. 2, and it is required that the outgoing ray L2 bypasses the rendezvous portion B, and that the outgoing ray L2 is facing downward, then the following relationship is present:

$$90°-2\alpha\leq\beta \text{ and } 2\alpha<90°, \text{therefore,}$$

(90°−β)/2≤α<45°, the value of the first included angle α is limited by the second included angle β.

As in the position of point P' in FIG. 2, since θ'>α' at P', in the case that the magnitude of the first angle of entrapment α' satisfies the above equation of relationship, the angle of deflection of the outgoing light ray L2' to the right with respect to the reflecting surface normal n' is also greater than the first angle of entrapment α', and the outgoing light ray L2' is sufficiently large enough to bypass the first incident surface 11 and directly arrive at the first outgoing surface 21, thereby avoiding stray light generation.

According to the above-mentioned relationship between the first included angle α and the second included angle β, for the respective second included angles β of different points on the reflective surface 3, the second included angle β changes continuously, and the corresponding first included angle β can be obtained correspondingly. The included angle α is used to form the inclination angle of the reflective surface 3 at this point, form sub-reflective surfaces passing through each point, and connect adjacent sub-reflective surfaces to form a smooth continuous convex surface.

In one embodiment of the present invention, the first included angle α and the second included angle β of the point on the reflective surface 3 satisfy: α=(90°−β)/2, and thus the points on the reflective surface 3 can be determined from the elevation angle of the point B of the rendezvous portion with respect to the normal direction x, i.e., the second angle β.

Figure 3:
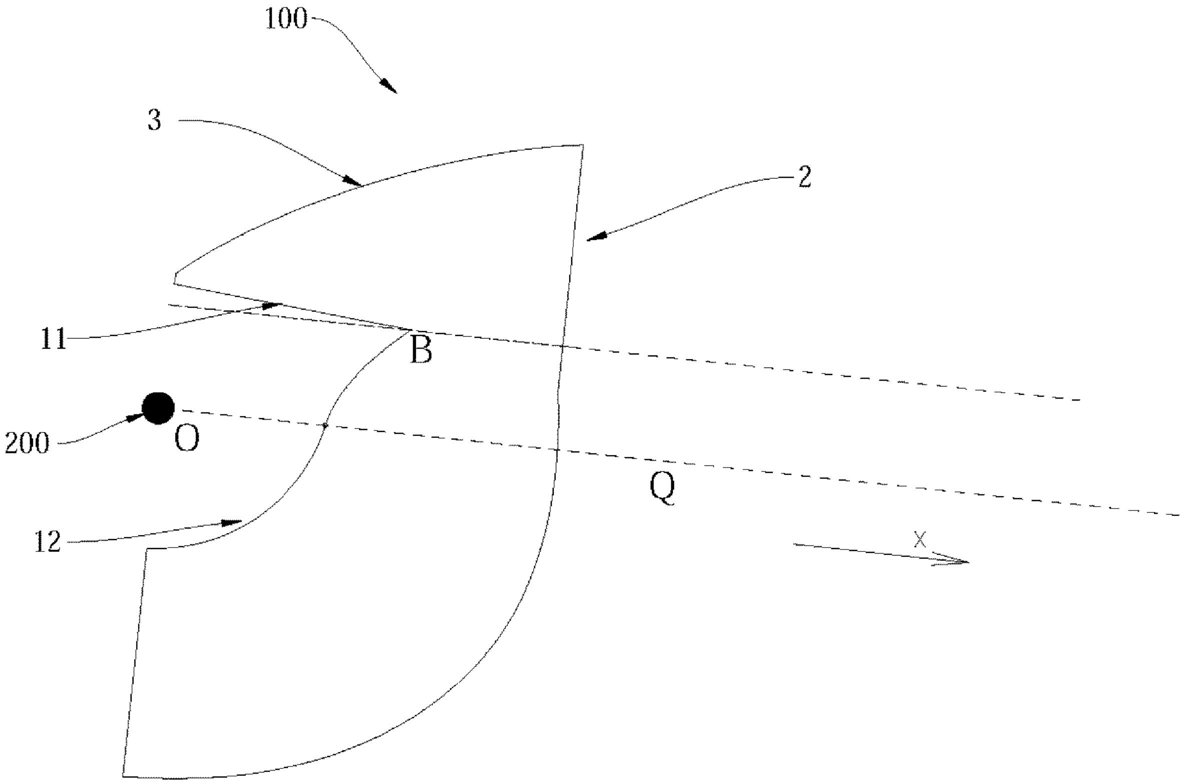
FIG. 3 is a schematic cross-sectional structure diagram of an embodiment of the uniform illumination lens of the present invention.

The first incident surface 11 is parallel to or forms an included angle with the normal direction x, as in the lens structure shown in FIG. 2, where the first incident surface 11 is parallel to the normal direction x; when forming an included angle, as in the lens structure shown in FIG. 3, one end of the first incident surface 11 intersecting the second incident surface 12 is closer to the normal line OQ than the other end of the first incident surface 11.

Further, a first bottom surface 5 is transitionally connected between the first incident surface 11 and the reflection surface 3, and the first bottom surface 5 matches the installation surface of the light source 200. If the size of the first bottom surface 5 is sufficiently small, it can be considered that the first incident surface 11 and the reflective surface 3 are connected at respective ends. Furthermore, the second incident surface 12 and the second outgoing surface 22 are transitionally connected with a second bottom surface 6, and the second bottom surface 6 and the first bottom surface 5 are coplanar. and when mounted, the lens 100 is placed on the mounting surface with the first bottom surface 5 and the second bottom surface 6.the first bottom surface 5 and the second bottom surface 6 prevent light from leaking from both sides of the bottom of the lens 100 after the light source 200 is installed.

Figure 4:
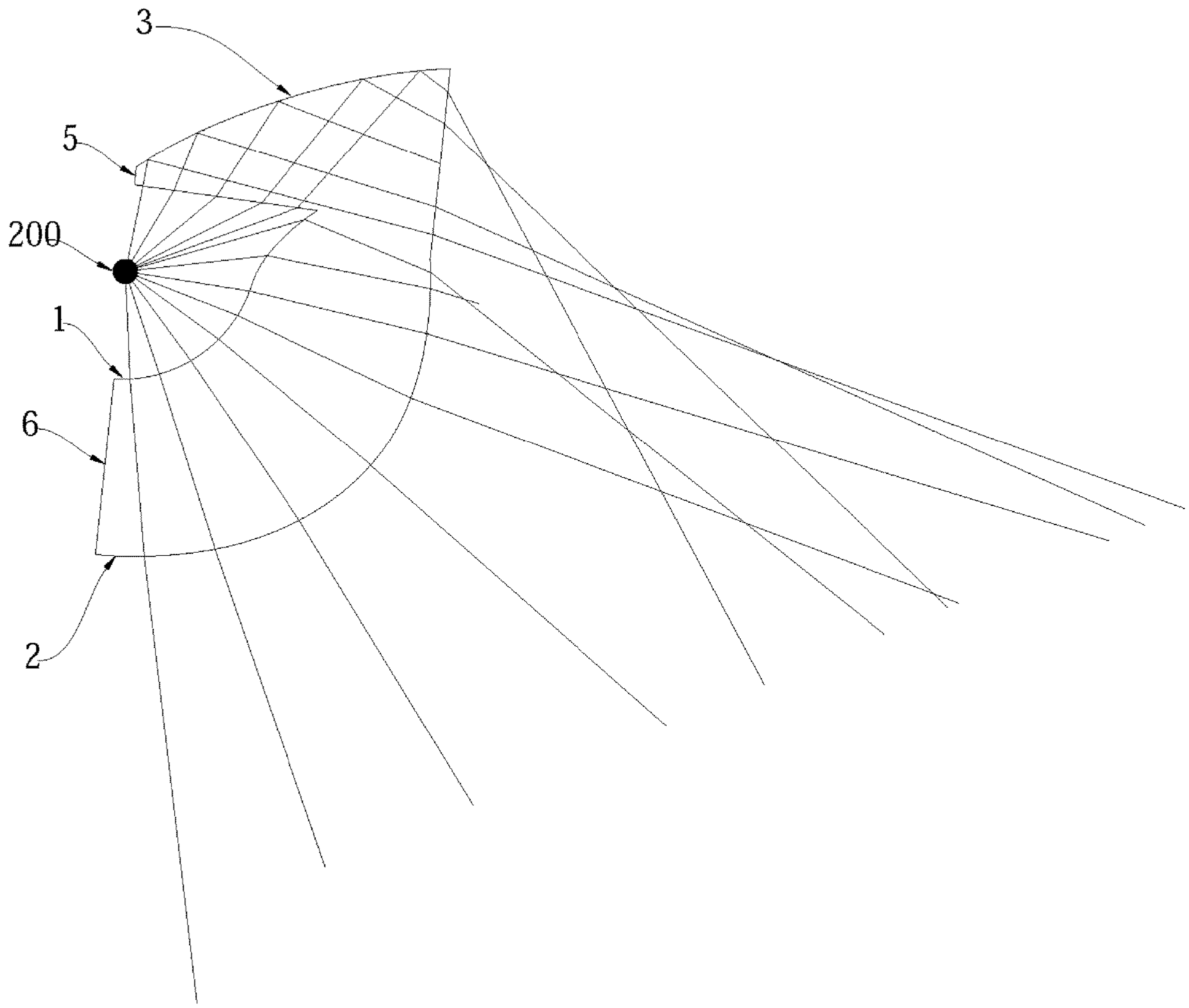
FIG. 4 is a schematic diagram of the overall optical path effect of the uniform illumination lens of the present invention.

According to the uniform illumination lens of the present invention designed as described above, the overall light path effect formed by the light emanating from the light source 200 after passing through the lens 100 is shown in FIG. 4.

Figure 5:
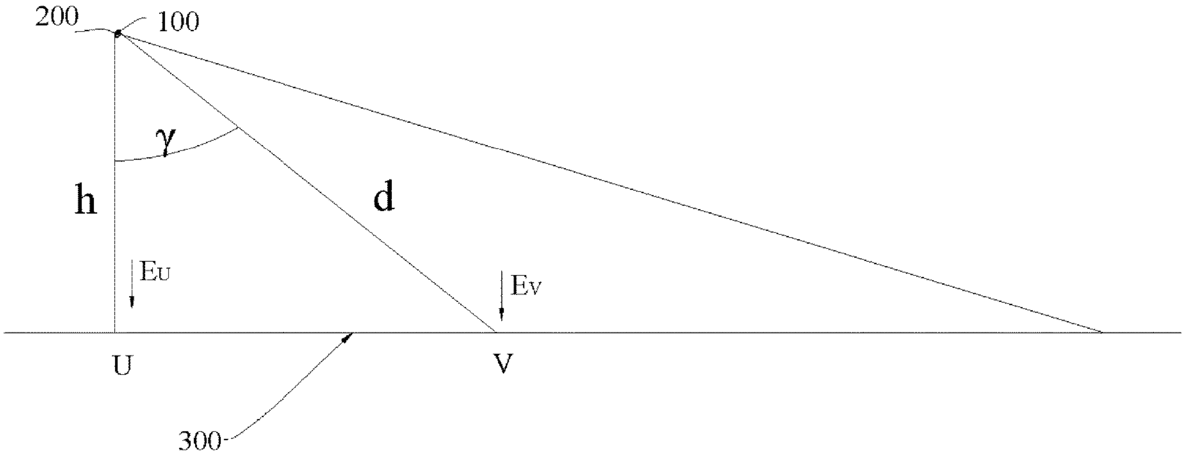
FIG. 5 is a schematic diagram of light rays of the uniform illumination lens on an illuminated surface in the present invention.

The lens of the present invention provides uniform illumination of the illuminated surface 300 including the near and far portions by the specific mechanism shown in FIG. 5. In accordance with the first law of illumination, for a point U on the illuminated surface 300 located in the perpendicular direction of irradiation, the illuminance $E_U$ of the point is calculated by the formula:

$$E_U=I_U/h^2,$$

where $I_U$ is the luminous intensity of the light source 200 towards the point U, h is the vertical distance between the light source 200 and the illumination surface 300;

For a point V that is irradiated obliquely on the illumination surface 300, the distance between the point V and the light source 200 is d, the angle between the light direction and the normal line n of the reflective surface of the illumination surface 300 is γ, and the intensity of the light emitted by the light source 200 toward the point V is $I_V$, the luminosity $E_V$ at the point V perpendicular to the irradiated surface is calculated by the formula:

$$E_V=I_V\cos\gamma/d^2=I_V\cos^3\gamma/h^2,$$

For the same illumination surface 300, the farther the illumination surface 300 is from the light source 200, as the included angle γ becomes larger, the illuminance variation decreases significantly according to the cube of the cosine angle.

Assuming that for $E_U=E_V$, then $I_V=I_U/\cos^3\gamma$ is required, the further away from the light source 200 on the illuminated surface 300 the greater the luminous intensity in the corresponding direction is required, and as the included angle γ becomes larger, the $I_V$ needs to increase by a larger value.

Therefore, in order to be able to illuminate uniformly, the light effect is improved by total reflection of the reflective surface 3 on the far part of the illumination surface 300, and the light is evenly diffused by a diverging lens on the near part of the illumination surface 300, so that The luminous efficacy of near and far light is reduced and increased respectively, so as to achieve uniform illumination of the illumination surface 300 as a whole.

Figure 6:
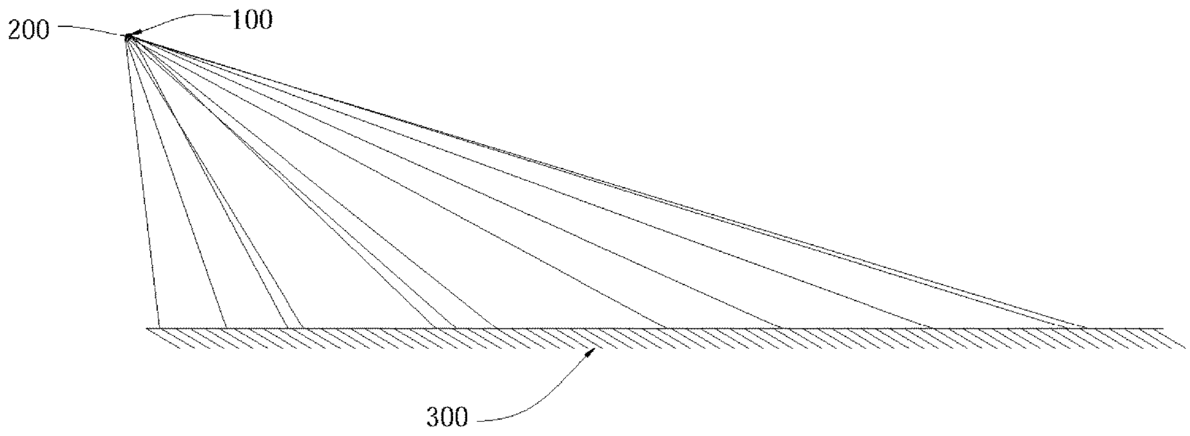
FIG. 6 is a schematic diagram of the illumination effect of the uniform illumination lens of the present invention on the illuminated surface.

Therefore, as shown in FIG. 6, the first outgoing surface 21 is a flat surface, which means a light-transmitting planar structure, and its main function is to refract the light after total reflection to a distance from the illumination surface 300 by refraction. After total reflection, Light intensity loss is low. Wherein, the lower end point of the first outgoing surface 21 is lower than the connection line between the near-light end A and the rendezvous part B; The second outgoing surface 22 is a convex surface, i.e., a light-transmitting convex structure, so that the light rays refracted by the second incident surface 12 and entering the lens 100 are divergently diffused to the illuminated surface 300 below, wherein the portion of the second incident surface 12 at the normal line OQ on the side opposite to the first incident surface 11, i.e., the portion with a contact point C as the demarcation point, the portion on the lower side of the normal line OQ is provided as a concave translucent surface, i.e., a concave structure for transmitting light to diffuse the light rays in conjunction with the second outgoing surface 22, and on the other side, the portion on the same side of the second incidence surface 12 as the first incidence surface 11, i.e., the BD portion on the upper side of the normal line OQ is provided as a convex surface, which portion is provided as a convex surface in order to cause the rays of light rays passing through therein to converge and deflect toward a rightward lower side.

Figure 7:
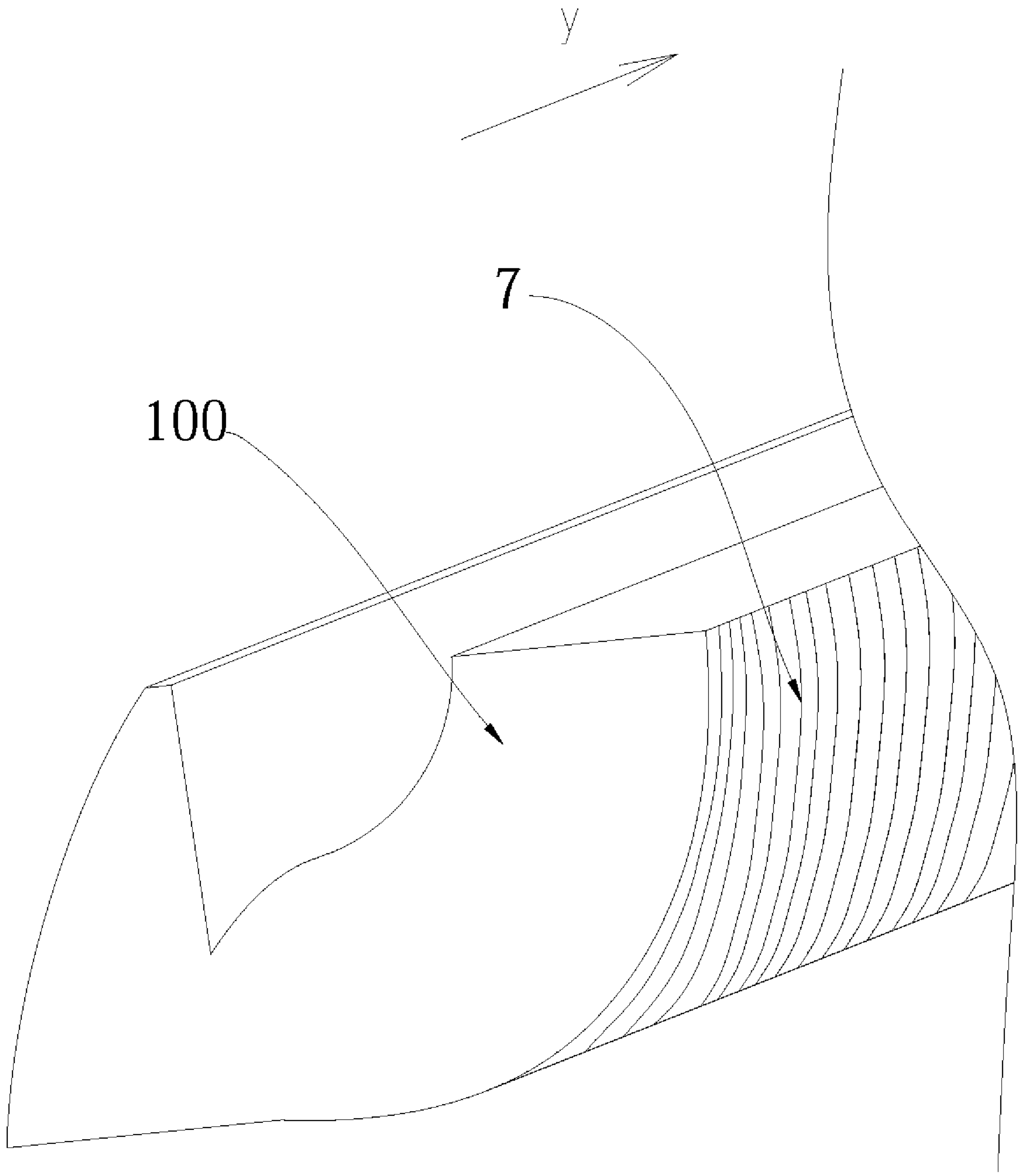
FIG. 7 is a schematic diagram of the three-dimensional structure of the uniform illumination lens of the present invention.

In one embodiment of the present invention, the uniform illumination lens is elongated, as shown in FIG. 7, and the cross-section of the lens in the perpendicular length direction y is as shown in FIG. 1, and the light receiving surface 1 comprises a first incident surface 11 and a second incident surface 12 to form an accommodating cavity 13, and a light source 200 is arranged in the accommodating cavity 13, and the light source 200 includes a plurality of LED point light sources on a printed circuit board, and the plurality of LED point sources are provided spaced apart on a light source mounting surface 430 of the printed circuit board along a length direction y of the lens 100, and the lens 100 is used for adjusting the light distribution of the LED point sources in the plane perpendicular to the length direction y, so as to realize uniform illumination in a far and near place.

Optionally, the lens of the present invention is used for light distribution of a line light source. The light distribution surface 2 is provided with strip-shaped light-transmitting ribs 7, which are convex surfaces. A plurality of light-transmitting ribs 7 are parallel to each other and connected in sequence to form a linear light-emitting structure, which stretches the point light source into a line light source along the length direction y of the lens 100. Further, the strip-shaped light-transmitting ribs 7 are arranged along the length direction y of the lens 100, and are used to convert each LED point light source into a plurality of continuous sub-point light sources, and adjacent sub-point light sources are butted or overlapped to form a line light source.

Figure 8:
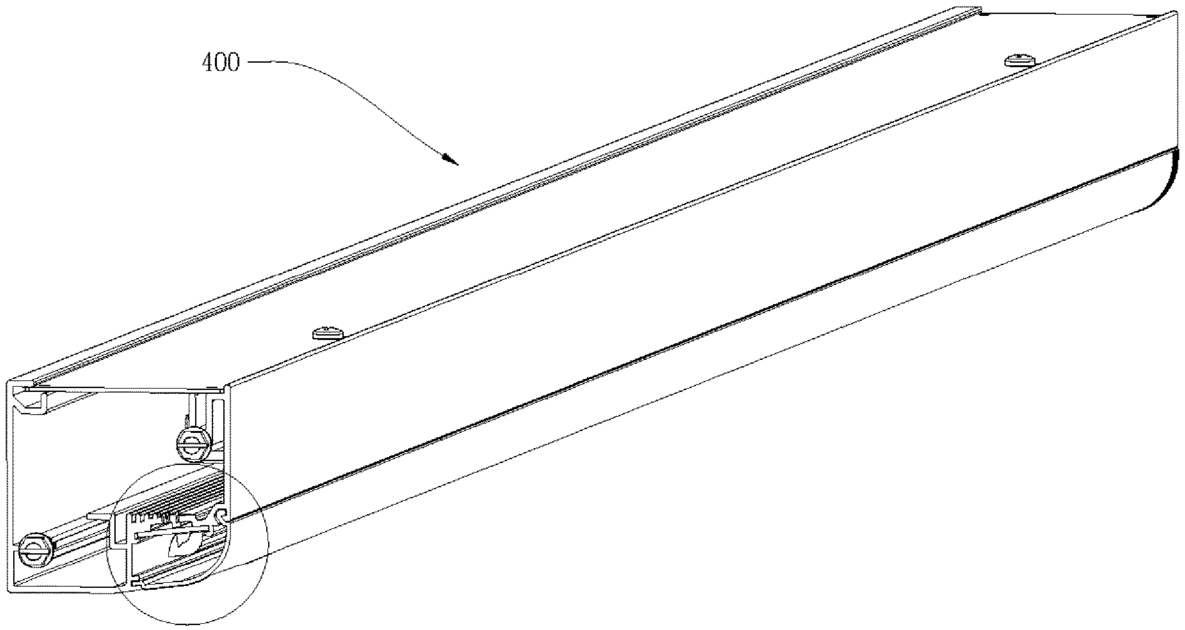
FIG. 8 is a schematic diagram of the product structure of the uniform illumination lens of the present invention used in a lamp.
Figure 9:
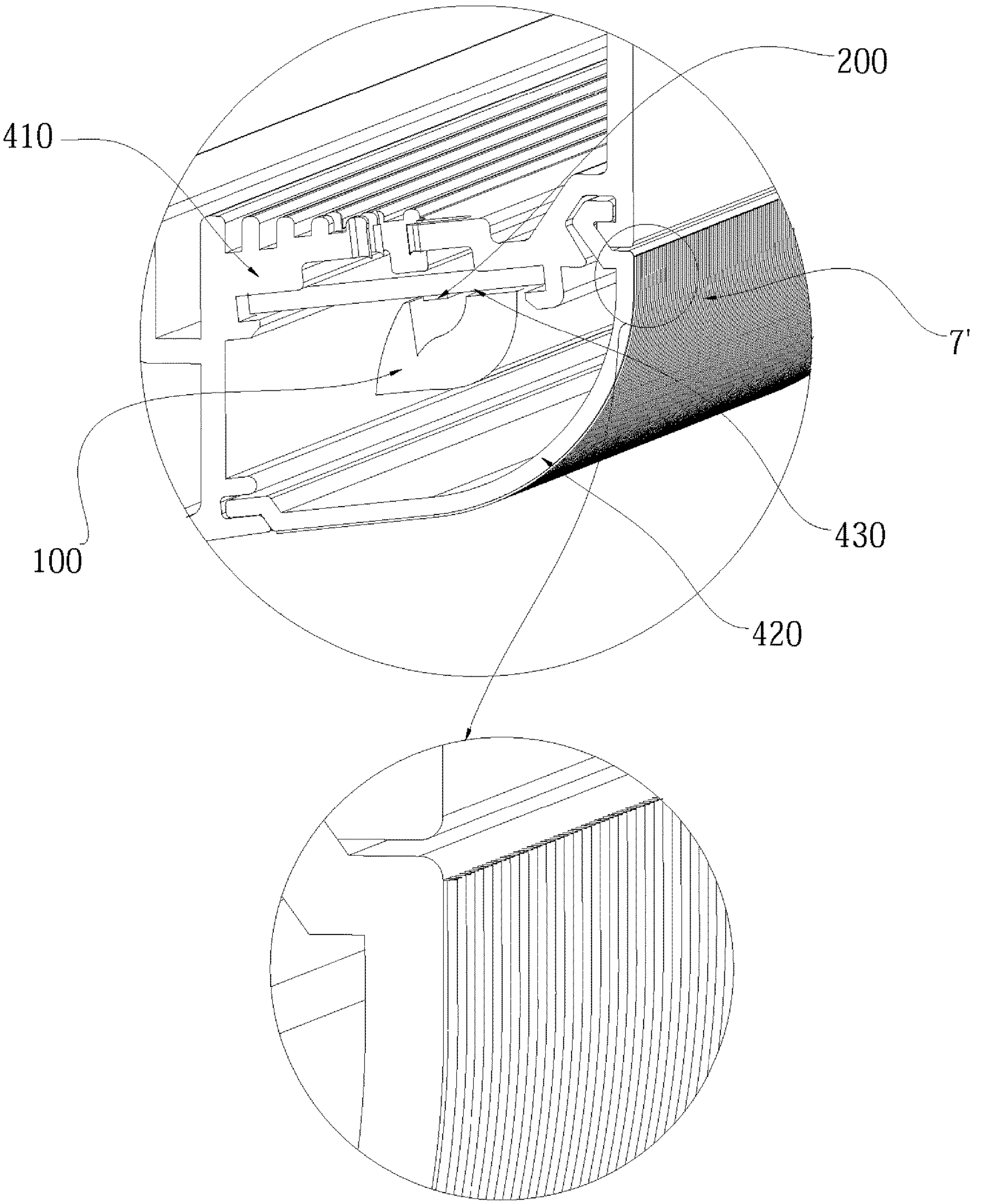
FIG. 9 is a partial enlarged view of the lamp shown in FIG. 8.

The present invention also provides a lamp applying the above-described uniform illumination lens, as shown in FIGS. 8 and 9, the lamp 400 of the present embodiment, comprises a lamp holder 410, a lampshade 420, a lens 100, and a light source 200, and the lens 100 and the light source 200 are both provided on a installation surface 430 on the lamp holder 410, and, specifically, the lens 100 is fixed to the lamp holder 410 at a first bottom surface 5 and a second bottom surface 6, the light source 200 is disposed within the accommodating cavity 13 of the lens 100. The lens 100 and the lamp holder 410 are both in the shape of an elongated strip, and the light source 200 is provided with a plurality of LED chips, which are provided at intervals along the length direction y of the lamp holder 410 on a circuit board.

Furthermore, the lamp of the present invention is used for light distribution of line light sources. and one embodiment is provided with strip-like light-transmitting rib 7 on the light distributing surface 2 of the lens 100, the light-transmitting rib 7 is arranged in a length direction y along the lens 100, and another embodiment is provided with a strip-like light-transmitting rib 7 on the lampshade 420, which may be a structure forming the light-transmitting rib 7 on the external surface of the lampshade 420, or an optical film having the light-transmitting rib 7 is provided on the external surface of the lampshade 420 or on the inner surface of the lampshade 420, in order to form the effect of a stretched light source.

The preferred specific embodiments of the present invention have been described in detail above. It should be understood that those skilled in the art can make many modifications and changes according to the concept of the present invention without creative efforts. Therefore, all technical solutions that can be obtained by those skilled in the art based on the concept of the present invention through logical analysis, reasoning or limited experiments on the basis of the prior art shall be within the scope of protection defined by the claims.

What is claimed is:

1. A uniform illumination lens, which is arranged between a light source (200) and an illumination surface (300), which includes a light receiving surface (1) and a light distribution surface (2), and the light source (200) is installed on a substrate (4), a normal line (OQ) of the substrate (4) passes through the light source (200), characterized in that:

the light receiving surface (1) comprises a first incident surface (11) and a second incident surface (12) intersecting, and the first incident surface (11) and the second incident surface (12) constitute the accommodating cavity (13) of the light source (200), and the first incident surface (11) is arranged on one side of the normal line (OQ) away from the illuminated surface (300), and the normal line (OQ) is passed through the second incident surface (12);

the light distribution surface (2) comprises a connected first outgoing surface (21) and a second outgoing surface (22), the first outgoing surface (21) and the first incident surface (11) are arranged on the same side of the normal line (OQ), and the contact point (C) of the first outgoing surface (21) and the second outgoing surface (22) is closer to the normal line (OQ) than the first incident surface (11);

the light distribution surface (2) further comprises a reflective surface (3), one end of which is connected to the first outgoing surface (21);

on one side of the normal line (OQ), all the light entering from the first incident surface (11) in the lens (100) is totally reflected by the reflective surface (3), and the reflected light is emitted through the first outgoing surface (21), and the reflected light does not intersect with the first incident surface (11); on the other side of the normal line (OQ), the second outgoing surface (22) receives light entering from the second incident surface (12) on one side of the normal line (OQ).

2. The uniform illumination lens as claimed in claim 1, wherein the reflective surface (3) has a near-light end (A) close to the light source (200), the first incident surface (11) has a rendezvous part (B) intersecting with the second incident surface (12), and the linear extension of the line between the near-light end (A) and the rendezvous part (B) intersects the first outgoing surface (21).

3. The uniform illumination lens as claimed in claim 2, wherein in the cross-sectional direction of the lens (100), for any point on the reflective surface (3), the included angle between a tangent line passing through this point and the normal direction is defined as the first included angle $\alpha$, and the included angle between the connection line between the point and the intersection part (B) and the normal direction is the second included angle $\beta$, then the first included angle $\alpha$ satisfies the relation expression: $(90°-\beta)/2 \leq \alpha < 45°$.

4. The uniform illumination lens as claimed in claim 3, wherein for adjacent points on the reflective surface (3), as the second included angle $\beta$ increases, the first included angle $\alpha$ decreases continuously.

5. The uniform illumination lens as claimed in claim 4, wherein the reflective surface (3) is a smooth continuous convex surface.

6. The uniform illumination lens as claimed in claim 1, wherein the first incident surface (11) is parallel to the normal direction.

7. The uniform illumination lens as claimed in claim 1, wherein the first incident surface (11) forms an included angle with the normal direction, and one end of the first incident surface (11) intersecting with the second incident surface (12) is closer to the normal line (OQ) than the other end.

8. The uniform illumination lens as claimed in claim 1, wherein a first bottom surface (5) is transitionally connected between the first incident surface (11) and the reflective surface (3), and the first bottom surface (5) matches the installation surface (430) of the light source (200).

9. The uniform illumination lens as claimed in claim 1, wherein the first outgoing surface (21) is a flat surface.

10. The uniform illumination lens as claimed in claim 1, wherein the second outgoing surface (22) is a convex surface.

11. The uniform illumination lens as claimed in claim 10, wherein a part of the second incident surface (12) on the side of the normal line (OQ) opposite to the first incident surface (11) is set as a concave surface.

12. The uniform illumination lens as claimed in claim 11, wherein a part of the second incident surface (12) on the same side of the normal line (OQ) as the first incident surface (11) is set as a convex surface.

13. The uniform illumination lens as claimed in claim 1, wherein the lens (100) is elongated.

14. The uniform illumination lens as claimed in claim 13, wherein strip-shaped light-transmitting ribs (7) are arranged on the light distribution surface (2) along the length direction of the lens (100) to form a linear light-emitting structure.

* * * * *